Feb. 24, 1970     R. F. BRADY ET AL     3,497,103

AIR SAVING HYDROPNEUMATIC TANK AND FLOAT ASSEMBLY

Filed Oct. 30, 1967

INVENTORS.
RICHARD F. BRADY, JEAN C. JOHNSON
and RICHARD L. HAISLEY

BY Woodard, Weikart, Emhardt & Naughton
Attorneys

United States Patent Office 3,497,103
Patented Feb. 24, 1970

3,497,103
AIR SAVING HYDROPNEUMATIC TANK AND
FLOAT ASSEMBLY
Richard F. Brady, Owensboro, Ky., Jean C. Johnson,
Indianapolis, Ind., and Richard L. Haisley, Owensboro,
Ky., assignors to Brady Air Controls, Inc., Muncie,
Ind., a corporation of Indiana
Filed Oct. 30, 1967, Ser. No. 679,091
Int. Cl. B65d 87/18
U.S. Cl. 220—26     25 Claims

ABSTRACT OF THE DISCLOSURE

A hydropneumatic tank lined with Teflon, and a plastic float employing a circular gas filled tube for buoyancy on water, and upper and lower frusto-conical flanges with outer circular edges adjacent the tank wall, and a central web extending across the water surface, to prevent absorption of air by the water. The upper flange and web provide a basin effect for extra buoyancy. Flow deflectors mounted inside the tank to cause entering water to be deflected toward the center of the float.

BACKGROUND OF THE INVENTION

Field of the invention

This invention relates generally to hydropneumatic tanks having water-air separator floats therein which are foldable for insertion into the tank through normal water inlet-outlet openings therein.

Description of the prior art

Known prior art includes a variety of air-water separator floats for hydropneumatic tanks. Examples of rigid floats appear in Taylor Patents 3,030,891; 3,191,536; and Faunce Patent 3,273,741. An example of a foldable type of float is shown in the Anderson Patent 3,159,301.

An advantage of the foldable float is the fact that in manufacturing, the float can be inserted through a water inlet fitting in the tank after manufacture of the tank itself has been completed. Such a fitting may typically be a 1 and ¼ inch threaded spud. As always, however, it is important that costs be minimized and effectiveness maximized. In addition to cost, other problems of foldable floats known heretofore include bulk, susceptibility to swamping, flexibility limitations by necessity of pressure resistant structure, and limitations on control of air absorption by water. The present invention is a substantial improvement over known state of the art devices because of its superior characteristics in these otherwise typical problem areas.

SUMMARY OF THE INVENTION

Described briefly, a typical embodiment of the present invention employs a float with an annular gas-filled plastic tube with a central web covering the water surface, and outwardly projecting flanges, one projecting generally upwardly and the other generally downwardly, the outer flange edges being near the inside wall of the tank and providing an annulus of quiescent water between the tube and the tank wall. A nonwettable lining is provided in that portion of the tank wall extending from the upper to lower water levels, and a baffle is disposed for directing water flow toward the float.

DESCRIPTION OF PREFERRED EMBODIMENTS

Figure 1:
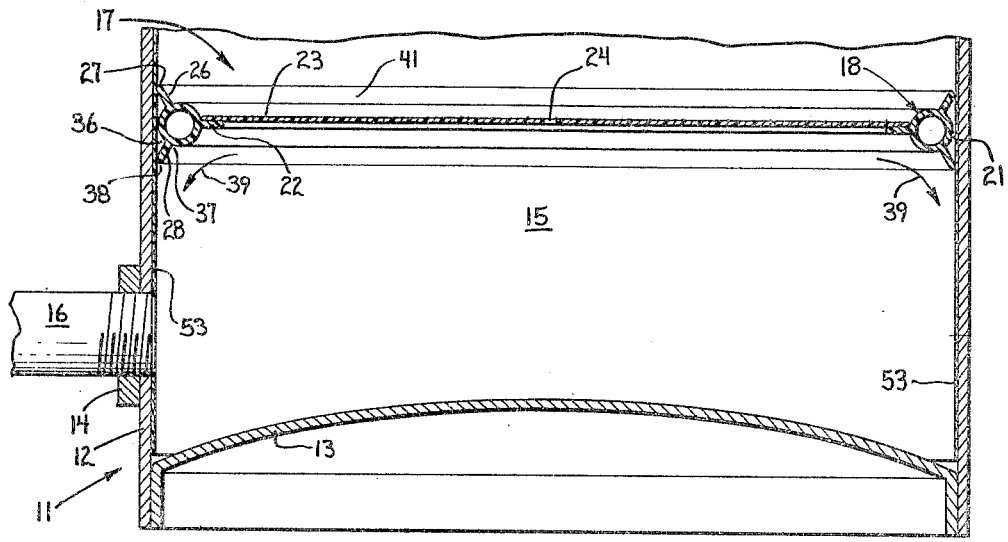
FIG. 1 is a vertical section through a cylindrical tank incorporating a typical embodiment of the present invention, the upper portion of the tank being omitted to conserve space in the drawings.

Referring now to the drawings in detail, and particularly FIG. 1, the hydropneumatic tank assembly 11 has a vertical cylindrical wall 12 closed at the top (not shown) and closed at the bottom by the bulkhead 13. A threaded spud is secured to the wall at 14 and receives a water inlet-outlet pipe 16. A float 17 is provided in the tank to provide a floating barrier to keep the air above the float from being absorbed by the water 15.

Figure 2:
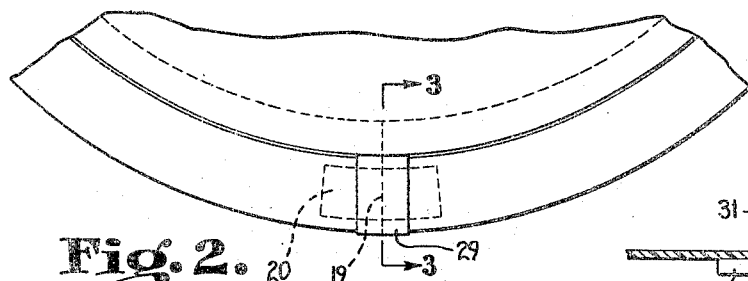
FIG. 2 is a fragmentary top plan view of the float showing a detail of a joint therein.

According to one feature of the invention, the float includes an extruded tube 18 of circular cross section and formed in a circle with the abutting ends meeting at 19 (FIG. 2). The tube is an extrusion of a flexible, resilient, kink-resistant plastic such as ethylene vinyl acetate. The two ends are brought together and typically plugged by a rigid plastic plug 20 fittingly received in both ends of the tube and sealed thereto by suitable adhesive bonding. However the plug can be omitted whereupon the two ends are dielectrically sealed, heat sealed or, with some plastics, solvent sealed. The tube is normally filled with air at atmospheric pressure, but it can be filled with any non-rigid buoyant material including other gases or polystyrene beads.

The outside diameter of the tube 18 approaches that of the inside wall of the tank so that a very narrow annular space is provided at 21 between the tube outer periphery and the tank wall.

Further according to the invention a horizontal circular flange 22 extends radially inward from the inner periphery of the tube 18 and serves as a convenient ledge for securing a central web 23 to the tube. This web is a thin plastic and can be ethylene vinyl acetate bonded to the flange 22 either by a chemical bonding agent or by dielectric welding (heat). This web is provided with a central aperture 24 for a purpose which will be described hereinafter.

A further feature of the invention is the provision of the flange 26 projecting upwardly and outwardly from the tube 18 so that the flange itself has a somewhat frusto-conical configuration. The free end 27 of the flange defines a circle and may be spaced very close to the inner wall of the tank. Similarly at flange 28 projecting downwardly and outwardly from the tube 18 is provided and may be identical to flange 26. The three flanges 22, 26 and 28 are portions of a single extrusion including the tube 18.

Figure 3:
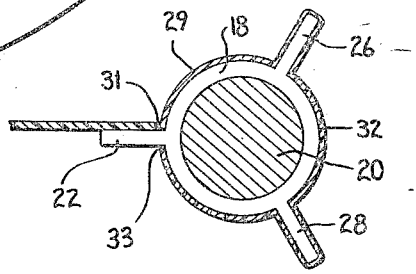
FIG. 3 is an enlarged section therethrough taken at the line 3—3 in FIG. 2 and viewed in the direction of the arrows.

Just as the two ends of the tube abut at 19, so do the two ends of each of the flanges. These can be sealed together by solvent welding, by dielectric welding, or need not be sealed together but can be covered by a suitable tape 29 as shown in FIGS. 2 and 3. This tape extends from one end thereof 31 at the flange 22 up around the tube 18, the flange 26, the outer wall of the tube at 32, around the lower flange 28 and back to the other end of the tape at 33.

To give one example of dimensions, for a tank having a 15½-inch inside diameter, the outermost diameter of the flanges may be 15⅜ inches, while the outside diameter of the tube 18 may be 15⅝16 inches. The cross sectional outside diameter of the tube 18 may be ½ to ⅝ inch and the overall height from the lowermost point of the lower flange to the uppermost point of the upper flange may be 1⅜ inches. A float having these dimensions can be folded double on any diameter not including the rigid plug 21 (FIG. 2) and inserted into the tank from the exterior thereof through the spud opening 14 as small as 1¼ inches in diameter. Once inside the tank, by virtue of the resilience of the tube 18, it will snap open to the configuration shown to serve its intended purpose. Thus, it is not necessary to employ special connectors, two piece tubing, and the careful handling required by the aforementioned Anderson float to insert it into the tank through a spud opening.

In the use of the float according to the present invention, the upper flange or "top fin" acts as a splash guard preventing turbulent water from splashing on top of the float. The lower flange or "bottom fin" decreases air absorption in three ways. First of all it produces an area of quiescent water at 36 (FIG. 1). The longer the flange, the more quiescent the water in the annular area formed by the tank wall and the flange. Secondly, if the water in the flanged annulus is completely calm, the diffusion of absorbed air through the annulus would be inversely proportional to the square root of the length of the annulus measured from the water level to the edge 38 of the flange nearest the tank wall. Thirdly, the flange acts as a scoop deflecting water away from the annulus area as indicated by the arrow 39 (FIG. 1).

The upper flange has a further beneficial effect. It cooperates with the web 23 and the portion of the tube above the web to form a sort of basin 41 which, so long as it is virtually empty of water, contributes effectively to the displacement buoyancy of the float. This is an advantage because, other things being equal, the turbulence or gallons per minute that a float can tolerate is proportional to the buoyancy of the float. Thus the float of the present invention has an unusually high tolerance for large flow rates and turbulence. This is because it has the sealed tube for primary buoyancy and the basin for secondary buoyancy, the latter being greater than the former.

Upon initially filling the tank, it is possible that water will partially fill the basin, reducing the secondary buoyancy, and therefore the effective buoyancy, for a time. However, according to another feature of the invention a very small orifice 24, of the order of ⅟16 inch diameter, is provided in the film of the web, usually at the center of the float and flush with the upper surface of the web. The advantage of this is the fact that while it does not facilitate upward flow of water into the basin, it does permit water to flow down through the orifice from the basin as a result of the constant, and therefore primary, though comparatively small buoyancy of the sealed tube and low density plastic material itself. Thus the sealed tube can empty the basin in from one to five hours. It thereby raises the web 23 to the water surface. By making the orifice small, as suggested above, it prevents exchange of water above and below the web, thus avoiding any increase in absorption rate, but it permits the primary buoyancy to drain from the basin that water which may have entered the basin during initial filling of the tank. The drain orifice thereby enables the primary buoyancy to reestablish the basin buoyancy. The orifice also enables draining of any water which might leak through from the annular space into the basin at the abutment of the two fins, in the event they are not sealed or taped.

Several important advantages are derived from this float construction employing the low-volume sealed tube, the upwardly and downwardly projecting flanges and the web with the small aperture. By using the basin and its buoyant effect, the volume and therefore the cross sectional size of the sealed tube can be comparatively small. It need only be buoyant enough to empty all but possibly a thin film of water from the basin, and that can be accomplished over a considerable period of time because entrance of water into the basin will be rare and in small amounts, except possibly at the initial filling of the tank. If a thin film of water remains on the web, it is saturated with air and can absorb no more. By providing a tube of small cross sectional dimensions, the amount of material can be minimized and yet the wall thickness will be adequate to withstand the pressure in the tank. To withstand a given pressure, the wall thickness of the tube is directly proportional to the cross sectional diameter thereof. Accordingly by a reduction of diameter a substantial decrease in the cost of the float can be realized. It is possible also, that by using materials of low density, the primary buoyancy can be furnished by buoy means other than a sealed tube, as such. The web itself, the flange 22 and flange 28 all contribute to the primary buoyancy of the illustrated float when the specific gravity of the materials used therefor is about 0.96. It is desirable that the buoyancy of the float be such as to locate the web at the water level. If manufacturing tolerances prevent such precise web location at equilibrium, tolerances permitting equilibrium with the web slightly below water are preferable to permitting the web to stabilize above the water level. When the web is slightly below, the thin film of water on the web causes no problem.

The thickness of the flanges is made such that they are of substantial length and yet, when the float is folded for insertion into a tank through the spud opening, the flanges will readily conform and will not interfere with the insertion. Yet they will again resume their original erect condition as soon as the float snaps open inside the tank. The float is virtually symmetrical with respect to a horizontal plane containing the web, so that there is no need to care which side is up when the float snaps open.

Figure 5:
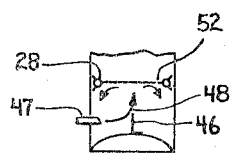
FIG. 5 is a fragmentary schematic of another version of the flow deflector and off-center float aperture.
Figure 4:
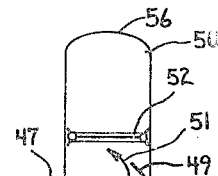
FIG. 4 is a small scale schematic diagram illustrating another embodiment of the invention with a water flow deflector and off-center float aperture.

It may be desirable in the use of a float according to the present invention, to direct at least a portion of the incoming water flow toward the center of the float so that the downwardly projecting flange can return the water toward the bottom of the tank, assuring no disturbance of the quiescent water annulus at 36. For this purpose as shown in FIG. 5, a deflector plate 46 is mounted to the bottom of the tank in line with the axis of the inlet pipe 47 so that the inflowing water is diverted upwardly as indicated by the arrow 48 so it impinges on the float web near the center thereof. It then moves outwardly and downwardly along the walls of the tank toward the bottom, being aided in this by the downwardly projecting flange 28. Another arrangement for this purpose is shown in FIG. 4 where an upwardly and inwardly inclined deflector plate 49 is mounted on the cylindrical wall of the tank opposite the inlet pipe 47 directing the water flow toward the center of the float as indicated by the arrow 51. In both of these embodiments of FIGS. 4 and 5, the orifice of the float is located near the perimeter of the web as indicated at 52.

According to another feature of the invention, the tank is provided with a lining 53 on its inner wall extending from a point below the low water level to a point near the top of the tank such as 50 or, for example, above the highest water level therein. Actually, the lining could be extended on the inner surface of the dome 56 of the tank, if desired. This lining or coating is of a material with a low coefficient of friction and which is not wettable, an example being Teflon. The effect of this is to avoid accumulation of water droplets on the inner wall as the water recedes in the tank. By avoiding such accumulation of water droplets, there is no possibility of air absorption by an accumulation of droplets on tank walls when the water recedes. Thus a further precaution against water absorption is taken according to this feature of the invention.

Figure 6:
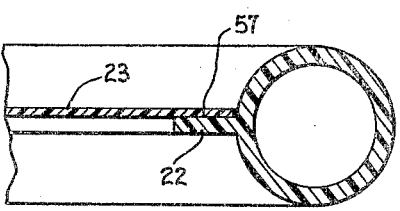
FIG. 6 is an enlarged cross section showing a detail of a float according to another possible embodiment.
Figure 7:
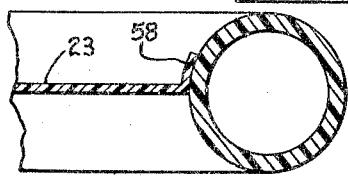
FIG. 7 is an enlarged cross section of still another possible embodiment of the float.

FIG. 6 shows in fragmentary cross section a portion of a float eliminating the upper and lower flanges but including the flange 22 facilitating the attachment of the web 23 thereto by solvent welding or dielectric welding around the perimeter of the web at 57. Such a float, while not the preferred embodiment, is preferable to insertable floats known in the art. A still more rudimentary version thereof is shown in FIG. 7 wherein the web 23 is bonded to the casing wall itself at 58 in the event the mounting flange 22 is not provided. The embodiments of FIGS. 6 and 7 are insertable in smaller spud openings than conventional insertable floats, and require less material, employing only one film for a web rather than two, for example.

The invention claimed is:

1. A gas-liquid separator float for a pressure tank, said float comprising:
   first buoy means buoyant in liquid and providing primary buoyancy for said float,
   barrier means attached to said buoy means and cooperating therewith to form basin means to provide secondary buoyancy in addition to said primary buoyancy,
   said first buoy means having sufficient buoyancy to maintain the bottom surface of the barrier means at least at the top of the liquid when no liquid is present on the top surface of the barrier means,
   and drain means in said barrier means permitting passage of liquid therethrough to communication with the underside of said basin means and enabling said buoy means to restore said secondary buoyancy after submersion of the float.

2. The float of claim of claim 1 said first buoy means being circular in shape and having a circumference of a certain diameter and foldable for insertion into a tank through a normal liquid inlet opening thereof having a diameter less than one tenth as great as said certain diameter.

3. The float of claim 1 wherein: said first buoy means include a sealed tube of flexible, resilient, kink-resistant plastic, and said barrier means include a web of flexible plastic.

4. The float of claim 1 wherein: said basin means is of greater volume than said buoy means whereby secondary buoyancy is greater than said primary buoyancy.

5. The float of claim 1 wherein: said drain means is of a size to resist upward flow of liquid therethrough during filling of a tank.

6. The float of claim 1 wherein: said barrier means has an upper face and said drain means include an aperture in said barrier means, said aperture having an entrance substantially flush with said upper face.

7. The float of claim 6 wherein: said barrier means is a web disposed substantially equidistant between the top and bottom of said buoy means.

8. The float of claim 7 wherein: said buoy means include a non-inflatable tube.

9. An air-water separator float for a hydropneumatic tank, said float comprising:
   a circular tube containing buoyant material,
   a peripheral flange projecting outwardly and upwardly from and above said tube,
   and a central web secured to said tube, said web, tube, and flange being thereby adapted to maintain separation between air in a tank and water in the tank on which the float is floated.

10. The float of claim 9 wherein:
    said float is foldable in half on a diameter thereof,
    said web, tube, and flange being sufficiently flexible to accommodate insertion of the folded float into a water tank through a normal water inlet opening therein,
    said tube being sufficiently resilient to promptly return said float to unfolded circular condition after insertion into the tank through the said opening.

11. The float of claim 9 wherein, the buoyancy of said tube is such as to urge said float to an equilibrium position locating said web at the water surface.

12. The float of claim 9 wherein: said web has an aperture therein enabling passage upwardly therethrough of any air under the web and enabling passage downwardly therethrough of any water accumulated on top of said web.

13. The float of claim 12 wherein: the area of said aperture is between that of a 1/16 inch diameter circle and a 1/8 inch diameter circle, the upper edge of said aperture being flush with the upper face of said web.

14. The float of claim 9 further comprising: a second peripheral flange projecting outwardly and downwardly from and below said tube, said flanges and said tube being an integral homogeneous unit of the same material.

15. The float of claim 14 and further comprising:
    a third flange projecting radially inwardly from said tube, said web being sealed around its perimeter to said third flange,
    said tube and said flanges being an integral extrusion of plastic material with the ends of the tube in face-to-face relation to form the circle of the tube,
    and a plug fittingly received and sealed in the facing ends of the tube and retaining them to face-to-face relationship and preventing entrance of liquid into the ends of said tube.

16. An air-water separator float for a hydro-pneumatic tank, said float comprising:
    a circular tube of a flexible, kink-resistant resilient material, said tube being normally disposed in a single plane but foldable in half on a diameter lying in said plane for insertion into a normal water inlet opening in a tank, and said tube being sufficiently resilient to promptly snap back into unfolded condition in a single plane after insertion through said opening,
    and a central web secured to said tube;
    a first circular flange projecting upwardly and outwardly from and above said tube,
    and a second circular flange projecting downwardly and outwardly from and below said tube.

17. The float of claim 16 wherein the material and cross section of said first and second flanges provide flexibility thereof sufficient to provide minimal resistance to the folding of said tube and instead fold readily therewith and conform thereto thus facilitating insertion of the float into a tank through the water inlet opening thereof, while having sufficient resilience to resume the outwardly projecting attitude thereof upon the unfolding of said tube.

18. The float of claim 16 wherein: the greatest diameter of said first flange equals the greatest diameter of said second flange.

19. The float of claim 18 wherein:
    said tube and flanges are a single extrusion with opposite ends thereof brought together in abutting relationship to establish the circular configuration in the single plane,
    said float having means providing continuity for said first flange at the point between the opposite ends thereof, and means providing continuity for said second flange at the joint between the opposite ends thereof.

20. The float of claim 19 wherein: said web has an orifice therein at the center thereof, the area of said orifice being less than that of a one eighth inch diameter circle.

21. A pressure water reservoir combination comprising:
    a generally cylindrical tank;
    float means freely floating on water in said tank and having a periphery closely adjacent the inside wall of said tank;
    and means mounted in said tank and directing the flow of entering water upwardly toward the center of said float.

22. The combination of claim 21 wherein: said flow directing means include a water inlet in a wall of the tank, and a baffle mounted to the tank in the path of water entering the tank through said inlet.

23. The combination of claim 22 wherein: said float means includes buoyant means for primary buoyancy, basin forming means for secondary buoyancy and drain means for draining water from the basin, said drain means being disposed remote from the center of said float to avoid upward flow of water through said drain means.

24. The combination of claim 22 wherein: said float means includes a circular floatation tube, a central web attached to said tube, and a circular flange projecting downwardly and outwardly from said tube and directing water flowing outwardly from the center of said web downwardly along the wall of said tank toward the bottom thereof.

25. The combination of claim 24 wherein: said tank includes a material of low friction coefficient and unwettable by water, said material providing the inside surface of the tank between the lowermost and uppermost water levels in said tank and avoiding droplet accumulation on the tank during recession of water therein toward said lowermost level.

References Cited

UNITED STATES PATENTS

| | | |
|---|---|---|
| 2,847,142 | 8/1958 | McClintock et al. |
| 2,888,717 | 6/1959 | Domitrovic. |
| 2,970,042 | 1/1961 | Lagerwey _____ 220—63 X |
| 2,981,437 | 4/1961 | Wissmiller. |
| 3,143,241 | 8/1964 | Howell _____ 220—64 |
| 3,159,301 | 12/1964 | Anderson. |
| 3,343,708 | 9/1967 | Haas. |
| 3,357,591 | 12/1967 | David _____ 220—26 |
| 3,366,266 | 1/1968 | Heartstedt _____ 220—26 |
| 3,375,951 | 4/1968 | Donald _____ 220—26 |
| 1,665,163 | 4/1928 | Gallagher. |

FOREIGN PATENTS

| | | |
|---|---|---|
| 883,770 | 12/1961 | Great Britain. |
| 701,627 | 1/1965 | Canada. |

GEORGE T. HALL, Primary Examiner

JAMES R. GARRETT, Assistant Examiner